United States Patent [19]

Bigus

[11] Patent Number: 5,442,730
[45] Date of Patent: Aug. 15, 1995

[54] ADAPTIVE JOB SCHEDULING USING NEURAL NETWORK PRIORITY FUNCTIONS

[75] Inventor: Joseph P. Bigus, Rochester, Minn.

[73] Assignee: International Business Machines Corporation, Armonk, N.Y.

[21] Appl. No.: 134,764

[22] Filed: Oct. 8, 1993

[51] Int. Cl.$^6$ ............................................. G06F 15/18
[52] U.S. Cl. ....................................... 395/22; 295/24; 295/650; 295/700
[58] Field of Search ..................................... 395/20-24, 395/650, 700; 364/401, 402

[56] References Cited

U.S. PATENT DOCUMENTS

| | | | |
|---|---|---|---|
| 5,067,099 | 11/1991 | McCown et al. | 364/550 |
| 5,067,107 | 11/1991 | Wade | 395/500 |
| 5,109,350 | 4/1992 | Henwood et al. | 364/550 |
| 5,109,475 | 4/1992 | Kosaka et al. | 395/22 |
| 5,113,500 | 5/1992 | Talboll et al. | 395/325 |
| 5,142,665 | 8/1992 | Bigus | 395/21 |
| 5,144,642 | 9/1992 | Weinberg et al. | 375/10 |
| 5,164,969 | 11/1992 | Alley et al. | 377/39 |

FOREIGN PATENT DOCUMENTS

| | | | |
|---|---|---|---|
| 58-217057 | 12/1983 | Japan | G06F 11/00 |
| 2216532 | 8/1990 | Japan | G06F 9/22 |
| 4112338 | 4/1992 | Japan | G06F 9/46 |

OTHER PUBLICATIONS

Stochastic Neural Networks for Solving Job-Shop Scheduling: Part I and Part II U.P. S. Foo, IEEE 24-27 Jul. 1988.

Adaptive Scheduling and Control Using Artificial NN and ExpertSystems for A hierarchical/Distributed FMS Arch. L. C. Rabelo 21-23 May 1990.

Average Waiting Time Assignment-Part II: The Integrated Services Network Case. Régnier et al. IEEE Nov. 1990.

Average Waiting Time Assignement-Part II: The Integrated Services Network Case. Régnior et al. IEEE Nov. 1990.

IEEE Transactions on Computers, vol. C-17, No. 11, Nov. 1968, entitled: "Process Performance Computer for Adaptive Control Systems" by Frank A. Russo and Robert J. Valek, pp. 1027-1037.

IBM Technical Disclosure Bulletin, vol. 33, No. 12, May 1991, pp. 156-158, Title: "Architecture for an Expert System Performance Analyzer" by G. J. Stroebel et al.

Proceedings of the 1991 IEEE International Conference On Robotics and Automation, Apr. 1991, Sacramento, Calif., pp. 2408-2413, C. Dagli et al, 'A Neural Network Architecture for Faster Dynamic Scheduling in Manufacturing Systems'.

(List continued on next page.)

Primary Examiner—Allen R. MacDonald
Assistant Examiner—Richemond Dorvil
Attorney, Agent, or Firm—Roy W. Truelson; Owen J. Gamon

[57] ABSTRACT

A job scheduler makes decisions concerning the order and frequency of access to a resource according to a substantially optimum delay cost function. The delay cost function is a single value function of one or more inputs, where at least one of the inputs is a delay time which increases as a job waits for service. The job scheduler is preferably used by a multi-user computer operating system to schedule jobs of different classes. The delay cost functions are preferably implemented by neural networks. The user specifies desired performance objectives for each job class. The computer system runs for a specified period of time, collecting data on system performance. The differences between the actual and desired performance objectives are computed, and used to adaptively train the neural network. The process repeats until the delay cost functions stabilize near optimum value. However, if the system configuration, workload, or desired performance objectives change, the neural network will again start to adapt.

14 Claims, 11 Drawing Sheets

OTHER PUBLICATIONS

IEICE Transactions On Information & Systems, vol. E76-D, No. 8, Aug. 1993, Tokyo JP pp. 947-955, R. Thawonmas et al. 'A Real-Time Scheduler Using Neural Networks for Scheduling Independent and Nonpreemptable Tasks with Deadlines and Resources Requirements'.

Operations Research, vol. 32, No. 2, Mar. 1984, US pp. 451-456, M. H. Rothkopf et al. 'There are no Undiscovered Priority Index Sequencing Rules for Minimizing Total Delay Costs'.

Computers Electrical Engineering, vol. 19, No. 2, Mar. 1993, Sacramento, Calif., US, pp. 87-101, Zhen-Ping Lo Et B. Bavarian, 'Multiple Job Scheduling with Artificial Neural Networks'.

|  | Example 1 | | Example 2 | | Example 3 | |
|---|---|---|---|---|---|---|
|  | Desired | Actual | Desired | Actual | Desired | Actual |
| Terminal | 1.0 | 1.132 | 1.25 | 1.207 | 1.25 | 1.165 |
| Batch | 3.5 | 2.518 | 4.0 | 2.55 | 4.0 | 2.462 |
| Transactions | 1.5 | 1.268 | 1.0 | 1.06 | 1.5 | 1.191 |
| Distributed | 1.5 | 1.289 | 1.5 | 1.236 | 1.0 | 0.992 |

FIG. 8

ADAPTIVE JOB SCHEDULING USING NEURAL NETWORK PRIORITY FUNCTIONS

CROSS REFERENCE TO RELATED APPLICATION

The present application is related to commonly assigned copending U.S. patent application Ser. No. 08/134,953, filed Oct. 8, 1993, to Bigus, entitled "Adaptive Resource Allocation Using Neural Networks", which is herein incorporated by reference.

FIELD OF THE INVENTION

The present invention relates to resource scheduling, and in particular to computer operating system functions which schedule resources for jobs executing on the system.

BACKGROUND OF THE INVENTION

Early digital computer systems were single user machines. That is, a single program or job took control of the entire computer, monopolizing all of its resources such as the CPU, memory, secondary disk storage and peripherals such as terminals and printers. It was quickly realized that this was a very inefficient use of costly computer hardware. One of the major reasons that computer software called operating systems were developed was to allow more than one user to use a computer system at a time.

It is the operating system's task to maximize the amount of work that a set of users can perform on a given computer system. The set of user jobs submitted to a computer system for processing is called the workload.

One of the major functions performed by a computer operating system is job scheduling or managing the workload. Job scheduling involves giving user jobs access to the computer system resources, especially the central processing unit (CPU). All jobs are not treated equally in most operating systems. Just as there are different categories of customers at a bank with differing importance and priorities, there are different classes of users on a computer system.

Over the years many different resource scheduling algorithms have been developed. The simplest job scheduling algorithm is first come first served. This is similar to a bank office with a single active teller. Each customer comes in the door and gets in line. The customer is served only after all of the customers ahead in line are served. A disadvantage of this algorithm is that if the first customer has a very long transaction, all of the other customers must wait.

Another job scheduling algorithm is shortest job first. In this approach (continuing the bank analogy), each customer is asked how many transactions he needs to make, and the one with the least number of transactions is served first. On average, this algorithm gives the best performance. Of course, it is hard to tell in advance how long it will actually take to serve the customer. He may have only one transaction, but it may be extremely complicated and take 15 minutes. Another customer may have two transactions which will only take one minute each. This difficulty in knowing ahead of time how long the customer is going to take has prevented the shortest job first algorithm from being used in computers. Another problem is that a customer with a large number of transactions may never get served! If new customers keep coming in the bank, they will get served ahead of him. This is called starvation. For this reason, it is desirable to introduce the concept of "fairness" in a job scheduler. A good scheduling algorithm is both efficient and fair.

To overcome these problems, priorities can be assigned to various classes of customers. Usually within a class, customers would be served in first come first served order. Suppose for example that there are three classes of customers, private, small business, and large business, having priorities of 1, 2, and 3 respectively, where higher is better. If one of each walks in the door at the same time, they will be served in this order: large business, small business, and private. If when the small business customer is being served, another small business customer comes in the door, he will cut in line before the private customer. This is called priority scheduling.

Even with the addition of priorities, job scheduling is still not as good as it could be. Another innovation has been to monitor the behavior of the job in the system to determine where the job should stand in line. Thus a customer would initially get in line at the appropriate place based on his priority. But if a customer being served was taking an unusually long time, he would have to give up his spot and move back to a position in the line. In this way the customers would each get served for at least some period of time during each time through the line. When all of the customers have the same priority, this is called round robin scheduling. In cases where customers have different priorities, a hierarchy of lines is developed, and customers who use too much time will get bumped to lower and lower priority levels. These is called multilevel feedback queues.

In 1988, IBM researchers Franaszek and Nelson explored the use of a delay-cost scheduler. This scheduling algorithm works on the idea that for each customer in the store there is an associated cost that must be paid if the customer is delayed. At any time, the scheduler picks the customer with the highest delay cost to serve next. In a significant departure from the previously described algorithms, the delay cost scheduler does not use static (fixed) priorities. You could think of the delay cost values as the dynamic (changing) priority of each customer. The priority changes as a function of the customer's time in the system, and the longer the customer stays in the system the higher his delay cost (priority) becomes. Each distinct class of customers would have its own associated delay cost curve or function.

The delay cost scheduler has the potential for providing efficient service to a set of job classes, yielding good average response times, and avoiding job starvation. However, in order to take advantage of the delay cost job scheduler, the appropriate delay cost (priority) functions must be determined. Unfortunately, this is not a straight-forward or easy process. Initial efforts have used linear (straight-line) delay-cost curves of arbitrary slope. Without a systematic and reliable method for constructing an appropriate delay cost function, the full potential of a delay cost scheduler can not be realized.

SUMMARY OF THE INVENTION

It is a principal object of the present invention to provide an enhanced method and apparatus for scheduling resources for a plurality of jobs.

Another object of this invention is to provide an enhanced method and apparatus for determining a respective delay cost associated with each of a plurality of jobs.

Another object of this invention to provide a more efficient technique for determining the delay cost priority functions for a set of job classes.

Another object of this invention is to increase the performance of a computer system which schedules jobs from multiple users.

Another object of this invention is to provide a technique for translating user specified performance goals into the necessary delay cost functions needed to reach those performance goals.

Another object of the invention is to use neural networks to serve as delay cost functions.

These and other objects are accomplished by the adaptive job scheduling using neural networks priority functions disclosed herein.

A job scheduler makes decisions concerning the order and frequency of access to a resource according to a substantially optimum delay cost function. The delay cost function is a single value function of one or more inputs, where at least one of the inputs is a delay time which increases as a job waits for service. The delay cost function may assume an arbitrary profile and can be dynamically adjusted to produce an optimum delay cost for a given set of user defined performance goals, system configuration and/or workload.

In the preferred embodiment, the job scheduler is part of the operating system of a multi-user computer system, which is responsible for scheduling access to computer system resources, particularly the central processing unit (CPU). A set of delay cost priority functions, one for each class of jobs in the system, is defined. These delay cost functions take a single input value (time-in-system) and produce a single output value (delay cost or priority). The delay cost functions are implemented by multilayer neural networks.

The neural networks are initially set to identical linear functions. The user specifies the desired performance objectives for each job class by setting a value indicating response times or other relevant performance measure. The computer system runs for a specified period of time, and a performance monitor collects data on the system performance. The differences between the actual and desired performance objectives are computed, along with the average time in system for jobs in each job class. This information is then used to adapt the delay cost neural network functions. This process repeats continually. When the average system performance meets the desired user performance the neural networks delay cost functions will stabilize near optimum value, and adaptation will cease. However, if the system configuration, workload, or desired performance objectives change, the neural network will again start to adapt.

In accordance with the present invention, a user is able to specify the desired performance objectives for the various job classes in a system and then have the job scheduler meet those objectives. This involves translating user objectives into associated delay-cost priority functions.

Neural networks have proven effective in nonlinear function approximation. The present invention employs neural networks to define the slope and shape of the delay-cost curves so that high-level end-user specified performance objectives can be translated into an appropriate low-level scheduling discipline. Furthermore, the present invention allows system specific delay cost curves to be learned, taking into account differences in hardware and software configurations, and differences in the system workloads.

BRIEF DESCRIPTION OF THE DRAWING

FIG. 8 shows the desired and actual performance of the computer system for three examples, according to the preferred embodiment

DESCRIPTION OF THE PREFERRED EMBODIMENT

Figure 1:
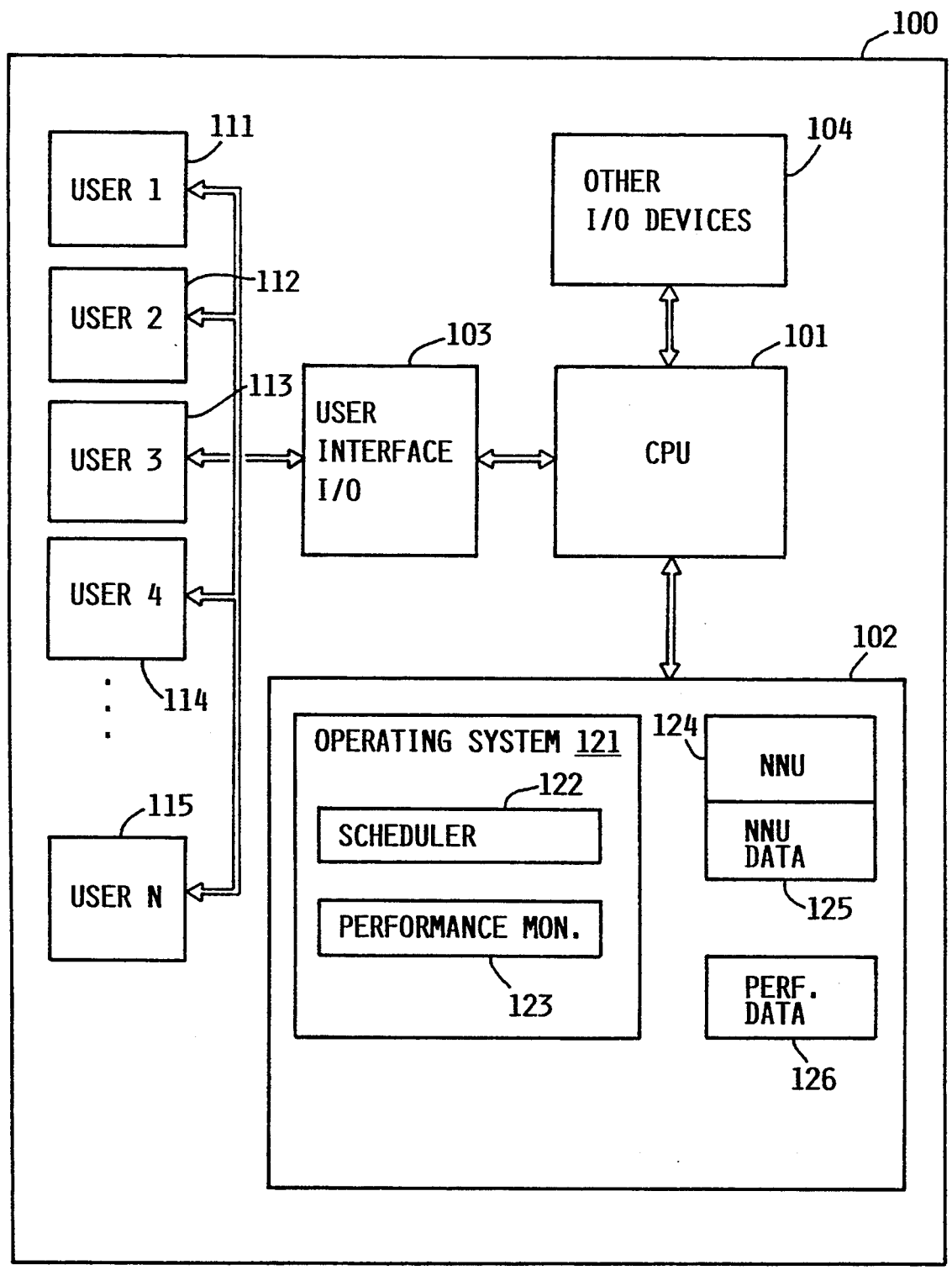
FIG. 1 shows a high level block diagram of the computer system according to the preferred system embodiment of the present invention.

FIG. 1 shows a high level block diagram of the computer system according to the preferred embodiment of the present invention. Computer system 100 comprises central processing unit or units (CPU) 101 connected to storage 102, to user interface I/O 103 and to other I/O devices 104. User interface I/O 103 allows multiple developers and users to communicate with other parts of computer system 100, normally through a plurality of programmable workstations 111-115. Other I/O devices 104 may include communications lines to local area networks or telecommunications networks. Although storage 102 is shown in high level FIG. 1 as a monolithic entity, it will be understood by those skilled in the art that storage typically comprises multiple levels, having at least a primary random access semiconductor memory (RAM) and a secondary memory such as magnetic disk drive or optical storage, and may also include high-speed caches, registers, etc.

Certain software components and data structures required for practicing the present invention in accordance with the preferred embodiment reside in storage 102. Operating system 121, resident in storage 102, performs functions typical of a computer operating system as are known in the art. Additionally, operating system 121 contains job scheduler 122 and performance monitor 123. Job scheduler 122 determines the order in which user jobs are serviced by CPU 101. Performance monitor 123 gathers statistics relevant to the performance of computer system 100, and in particular gathers statistics showing the average time required for computer system 100 to service jobs of different classes. Statistics gathered by performance monitor 123 are stored in performance data files 126 in storage 102.

Neural network utility 124 and associated data files 125 are also resident in storage 102; these are used to construct, train and execute neural networks for establishing the delay cost functions.

In the preferred embodiment, computer system 100 is an IBM Application System/400 midrange computer, although any computer system could be used. In the preferred embodiment, CPU 101 is a single or uniprocessor, however, multiple CPUs could be used. In the preferred embodiment, the job scheduler and neural network delay cost functions run on the CPU. However, the neural network functions could be performed on a specialized coprocessor.

Figure 2:
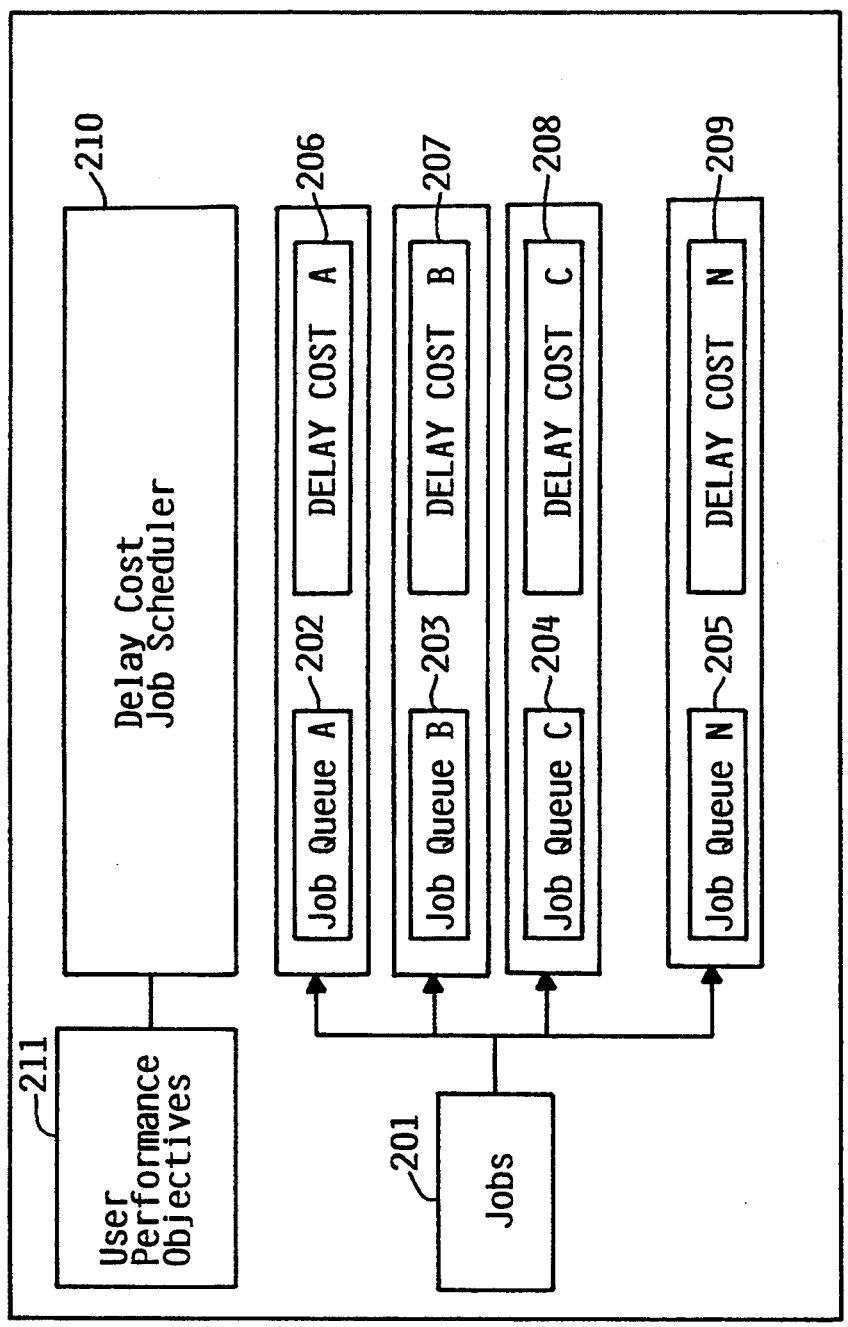
FIG. 2 shows the structure of the adaptive delay cost job scheduler according to the preferred embodiment.

FIG. 2 shows in greater detail the structure of job scheduler 122. There are N job queues 202–205, one for each job class. Jobs 201 enter the system as a result of workload submissions by users attached to workstations 111–115 or from other I/O devices 104. Jobs 201 are added to the appropriate job queue 201–205 based on the time-in-system, with the job having the largest time-in-system at the front of the respective queue. Jobs are dispatched to CPU 101 by the delay cost job scheduler 210. Each job queue 201–205 has an associated delay cost priority function 206–209. Each delay cost priority function 201–205 takes a single input (time-in-system) and produces a single output (delay cost or priority). User performance objectives 211 contain the desired performance objectives for each job class.

Figure 3:
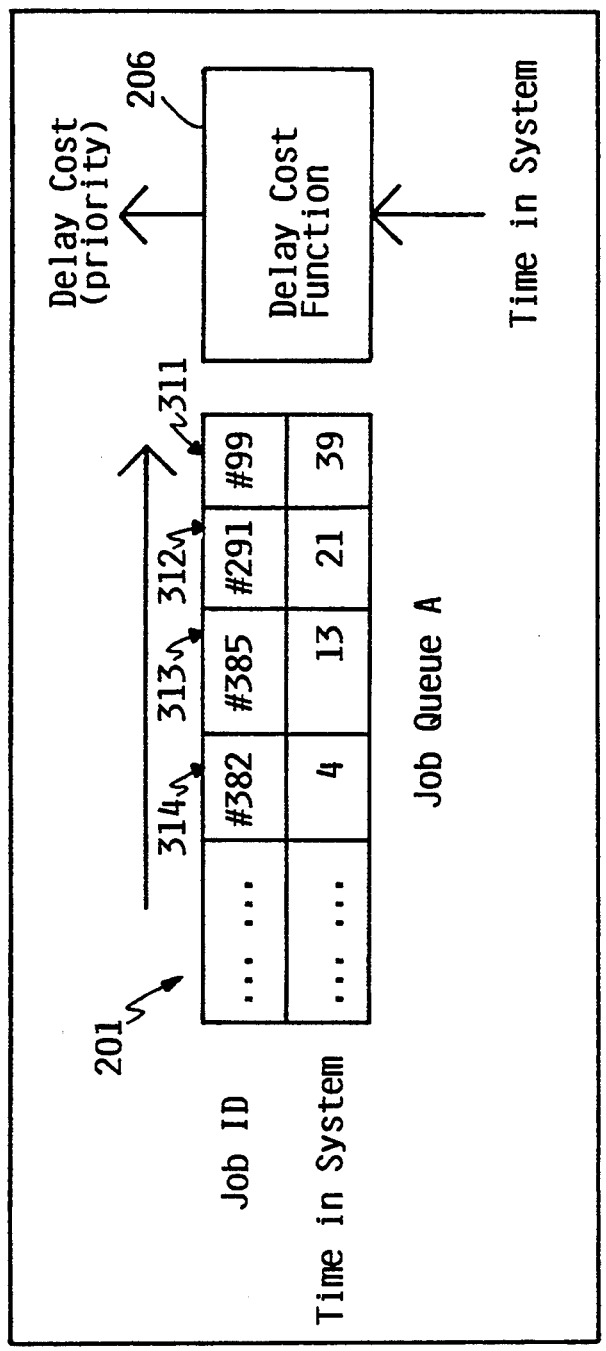
FIG 3 shows the structure of a job queue and associated delay cost function according to the preferred embodiment.

FIG. 3 shows the structure of a typical job queue 201, and the associated delay cost function 206. The job queue holds the set of current jobs 311–315 of a particular job class waiting for access to the CPU, along with information on the amount of time that each job has been in the system. The jobs in the queue are ordered according to time in the system, with the oldest job 311 at the head of the queue. The delay cost value (priority) is computed for each job queue by taking the time-in-system of the job 311 at the head of the queue and passing it through the delay cost function. Because job 311 is the oldest, and the delay cost function is a single variable monotonically increasing function of time-in-system, job 311 will have a higher delay cost than any other job in queue 201. The output of the delay cost function for job 311 is therefore the delay cost value for the associated job class.

In actual implementation according to the preferred embodiment, delay cost functions 206–209 are piecewise linear approximations to the substantially optimum delay cost functions produced by a neural network as described below. The coefficients of these linear approximations are stored in a delay cost function table. The time-in-system of a job is used to index an entry in the table containing the appropriate coefficients, from which the linear approximation for the relevant function segment is computed. These linear approximations are used in place of the actual neural network to reduce the computational overhead involved in determining delay cost. Depending on the hardware architecture, this computational overhead could be so significant as to destroy any performance benefits that would otherwise accrue from using the present invention. However, it would be possible to use the actual neural network to determine delay cost, particularly where a separate slave processor or coprocessor is available to perform the required calculations.

Delay cost functions 206–209 are constructed using artificial neural networks. Neural network utility 124 is a program for execution on CPU 101 which simulates a neural network. Neural network data structures 125 define the type of network to be simulated, the topology of the nodes, the adaptive weights to be assigned to the data paths, and other parameters. In the preferred embodiment, utility 124 is the IBM Neural Network Utility and data structures 125 are those data structures defined and used by the IBM Neural Network Utility. The operation of the IBM Neural Network Utility and its associated data structures is described in U.S. Pat. No. 5,142,665 to Bigus, issued Aug. 25, 1992, in U.S. Pat. No. 5,235,673 to Austvold et al., issued Aug. 10, 1993, and in commonly assigned U.S. patent application Ser. No. 07/986,889, filed Dec. 3, 1992, entitled "Apparatus and Method for Facilitating Use of a Neural Network", all of which are incorporated herein by reference.

The IBM Neural Network Utility used in the preferred embodiment supports simulation of several different types of neural networks on a single processor. A data structure representing the type and topology of the network is stored. For example, the number of inputs, number of outputs, data types of input and output, number of hidden nodes, connections between nodes, etc., are defined in the data structure. Additionally, a data conversion template may define a data type conversion and scaling function for data entering and leaving the network. This data structure is shown in FIG. 1 as element 125.

Figure 4:
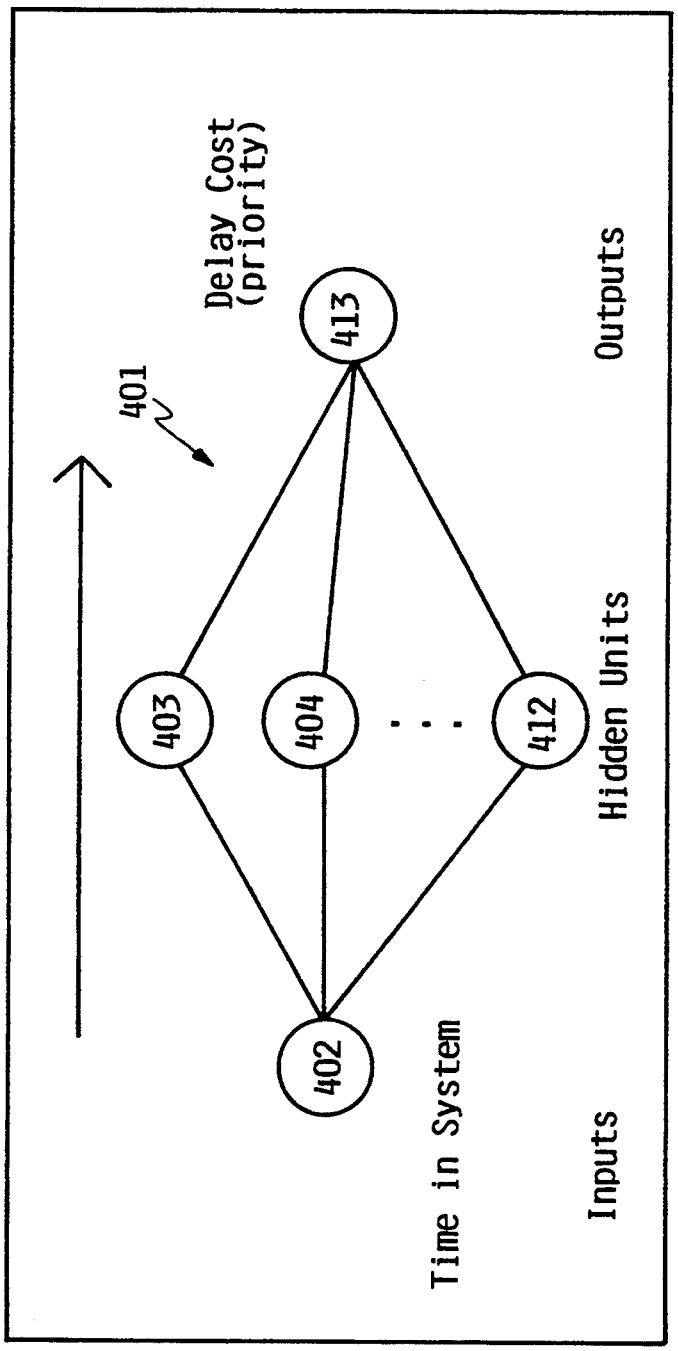
FIG. 4 shows the structure of the neural network used to construct the delay cost function according to the preferred embodiment.

FIG. 4 is a conceptual diagram of a typical neural network 401 used to construct a delay cost function in accordance with the preferred embodiment. A separate neural network 401 is used for each separate delay cost function (one for each job class). A neural network comprises a set of processing elements and adaptive weighted connections. Neural network 401 is a feedforward neural network with a single input value and a single output value. The network comprises a single input node 402, ten hidden nodes 403–412, and a single output node 413. It should be understood that FIG. 4 represents the neural network of the preferred embodiment in a conceptual sense only. In physical reality, this network is simulated by neural network utility 124 executing on CPU 101 in accordance with parameters stored in data structures 125. However, the network could be constructed as physical hardware processors and data links, or using a custom a custom neural network processing chip. The neural network operates in 2 distinct phases, training and execution.

During the training phase, the input(s) and the desired output values are presented to the neural network. In the forward pass, the input(s) are multiplied by the connection weights to the first layer of hidden units, and summed by each hidden unit. Each hidden unit then passes the sum through a nonlinear activation function. This process is repeated for any additional hidden layers, until the output of the neural network is computed at the final or output layer. The difference between the desired and actual output values is used by a learning algorithm to adjust the connection weights. In the preferred embodiment, the backward error propagation algorithm (Rumelhart, Williams, and Zipser, 1986) is used to adjust the values of the connection weights. However, there are many neural network training algorithms which could be used with equivalent results. The goal in the training phase is to adjust the weights in the neural network so that it produces the desired delay cost function.

During the execution phase, the neural network weights are not adjusted. Only the forward pass is performed (as described in the preceding paragraph), resulting in the computation of the delay cost value on the output unit. In fact, execution of the neural network is used as an intermediate phase to obtain values at a plurality of different time-in-system inputs for use in constructing the linear approximation delay cost function. In other words, a plurality of pre-determined time-in-system values is input to the neural network, the corresponding delay costs are received as output, and the slopes and intercepts of a piece-wise linear approximation are constructed from these values.

Figure 5:
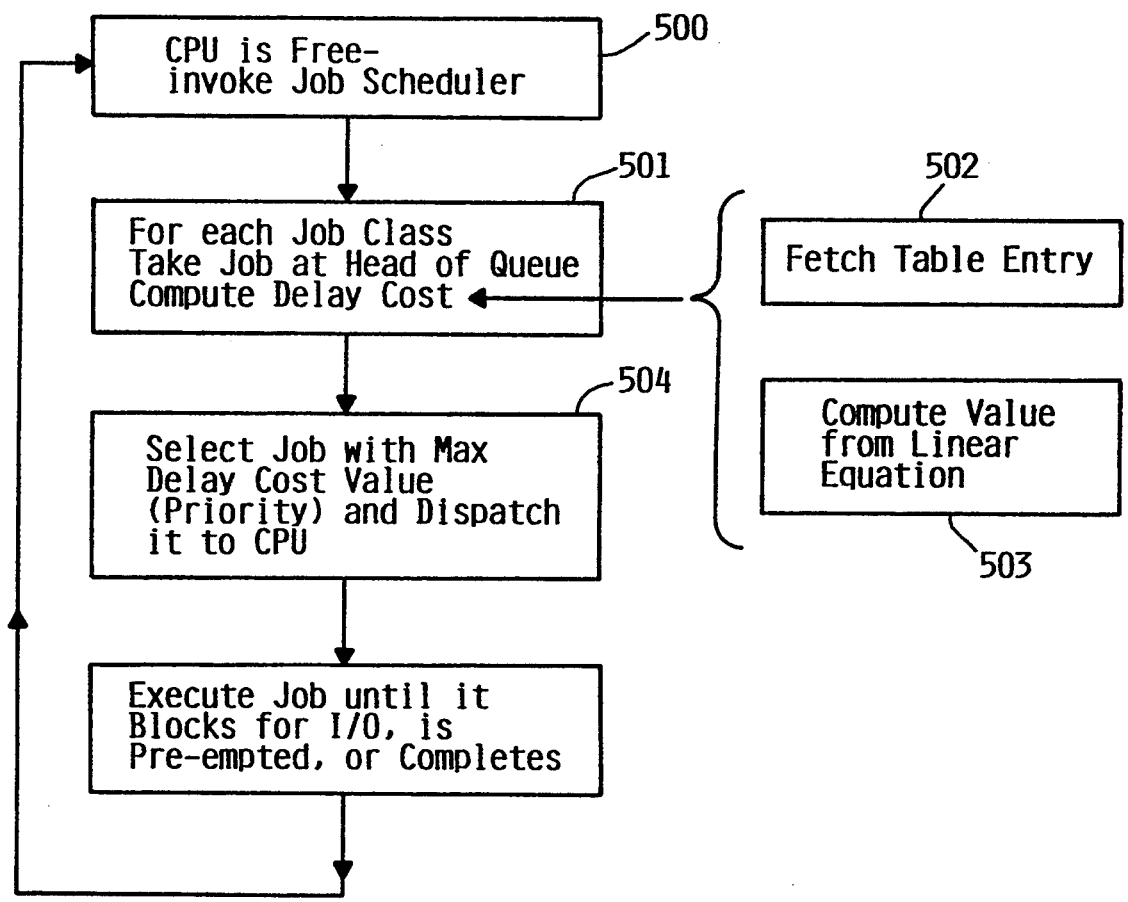
FIG. 5 is a flowchart showing the steps required for operation of the delay cost job scheduler according to the preferred embodiment.

FIG. 5 is a flowchart showing the steps required for operation of the delay cost job scheduler according to the preferred embodiment. The job scheduler has the multiple queue structure shown in FIG. 2. However, any job scheduler which uses a priority function to determine scheduling order can be used. When a resource, which in the preferred embodiment is CPU 101, is free, the delay cost job scheduler is called in block 500. In block 501, the job scheduler computes the delay cost or priority of the job at the head of each job class. Only the job at the head of the queue needs to be examined because jobs are queued in order based on their length of time in the system. The oldest job (longest time-in-system) is at the head of each job queue. The delay cost is computed by first fetching an entry in the delay cost function table corresponding to the time-in-system of the job at block 502. This table entry contains the slope and intercept of a linear approximation to the optimum delay cost curve (previously computed by the neural network) in the neighborhood of the input parameter (time-in-system). At block 503, the slope and intercept from the table and the time-in-system of the job are used to obtain the delay cost value by solving the linear equation. At block 504, job scheduler 122 selects the job with the largest delay cost value. At block 505, job scheduler 122 dequeues the job and places it in on the free CPU. This job then executes until it yields the CPU due to an I/O wait, to a preemption by a higher priority job, or when it completes. In the preferred embodiment there is no preemption of jobs once they are placed on CPU 101. When CPU 101 becomes free, control goes back to block 500.

Figure 6A:
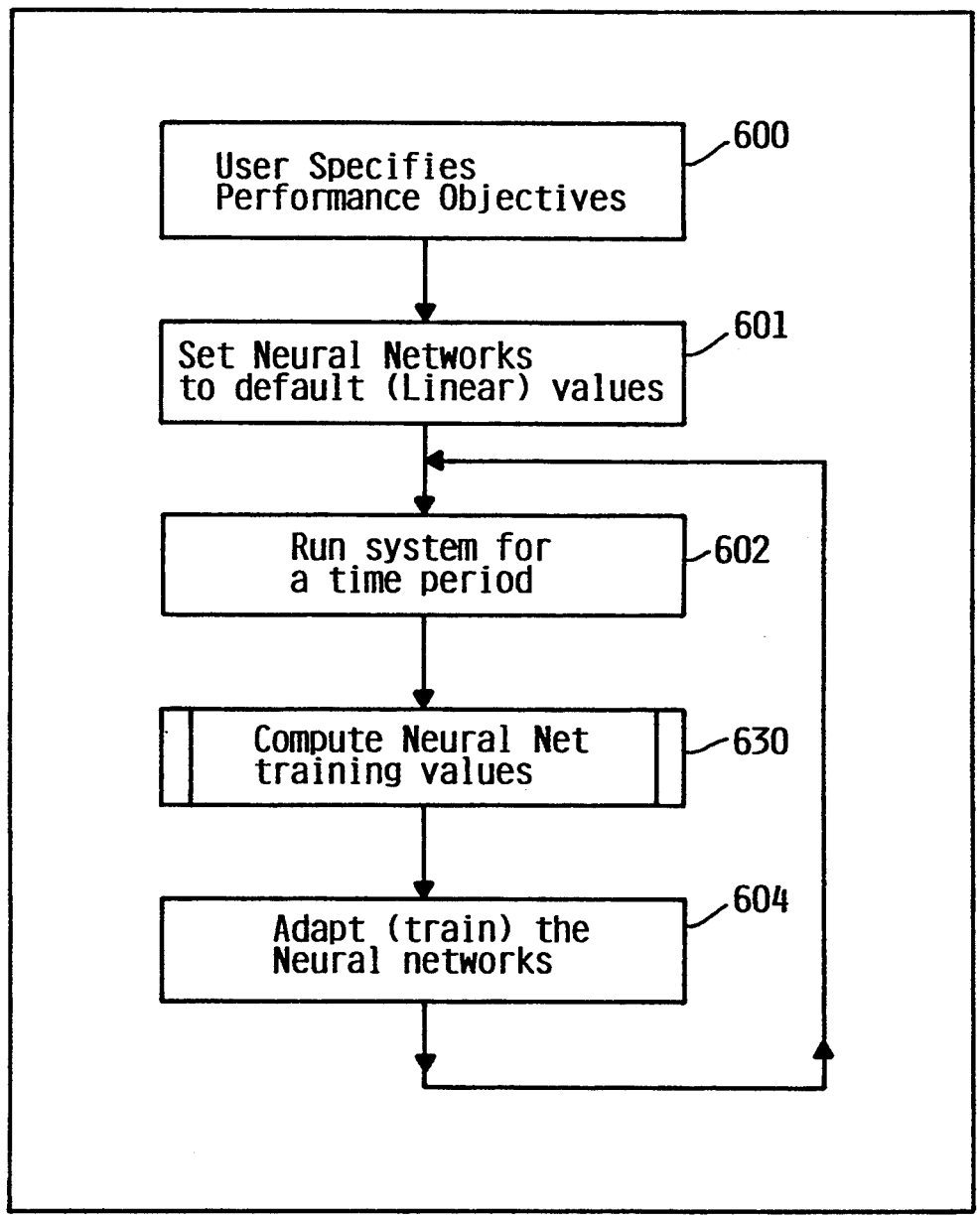
FIGS. 6A and FIG. 6B are flowcharts showing the steps required to construct a delay cost function according to the preferred embodiment.
Figure 6B:
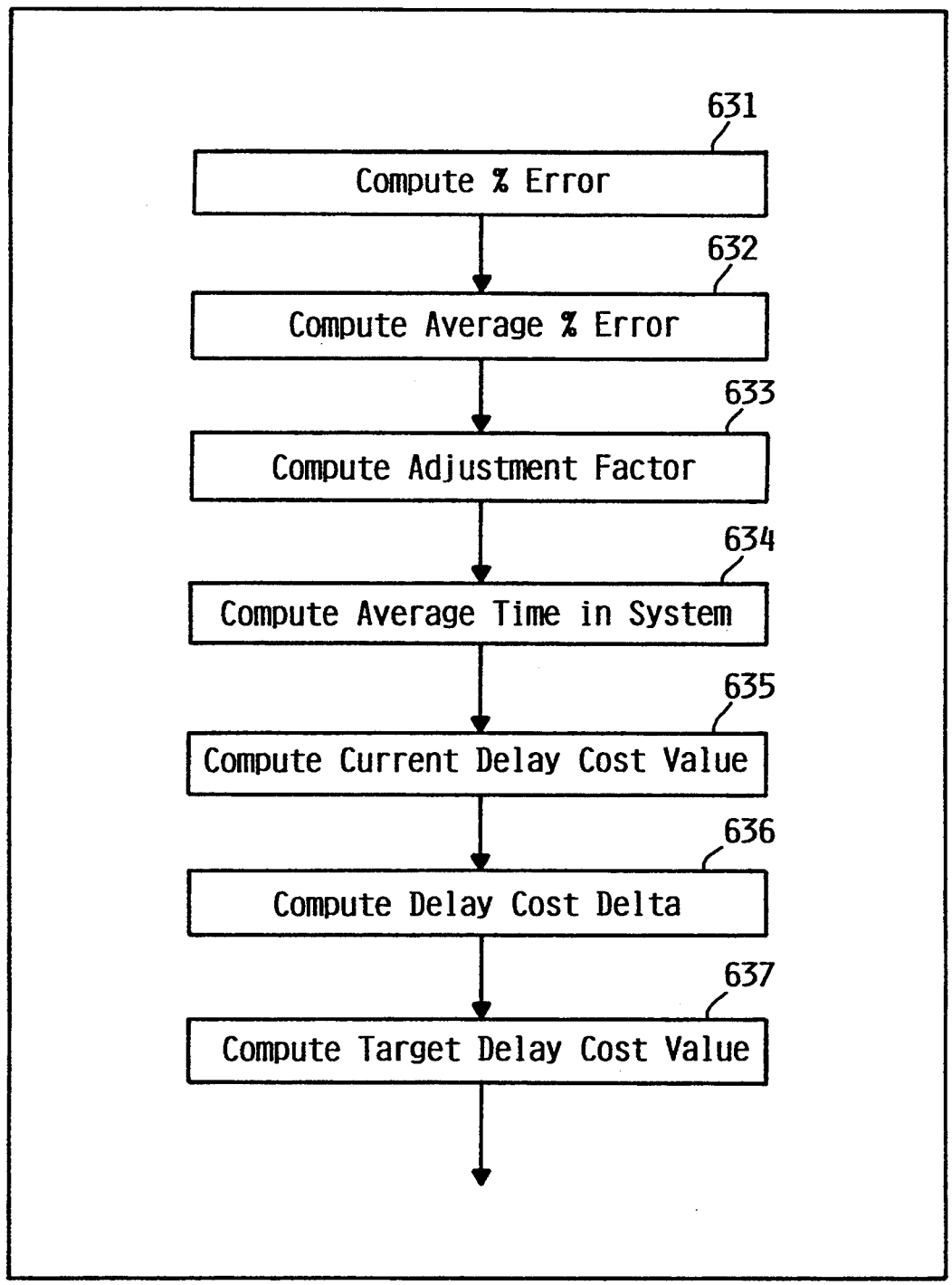

FIG. 6A and FIG. 6B are flowcharts showing the steps required to construct a delay cost function according to the preferred embodiment. Referring to FIG. 6A, at block 600, the user specifies the desired performance values for each job class, e.g. by interactively inputting these values from one of workstations 111–115. In the preferred embodiment, this value is the average response time for jobs of a class, although other performance objectives, such as throughput, may be specified. At block 601, the neural networks used to construct delay cost functions are initalized to their default values. In the preferred embodiment, this is a linear function with a domain of 0 to 100 seconds, and a range of 0.0 to 1.0. Block 602 represents the normal running of the computer system for some period of time to gather performance feedback. Jobs enter and are processed during this period. The delay cost scheduler makes the job scheduling decisions using the current neural network delay cost functions as described in FIG. 5. During this period, performance monitor 123 gathers performance statistics showing how close actual system performance is to the performance objectives. In particular, in the preferred embodiment monitor 123 obtains data concerning the average time required to complete jobs in the various classes. This data is stored in performance data files 126. At block 630, neural network utilty 124 is used to compute the target values for training the neural networks for each job class in the system. This process is described in greater detail below and depicted in FIG. 6B.

Referring now to FIG. 6B, at block 631 utility 124 computes the percentage error using the actual response times (Ract) and the desired response times (Rdes) as follows:

$$\%Error = (Ract-Rdes)/Ract.$$

At block 632 the average percentage error (%ErrorAvg) is computed by summing the %Error values for each job class and dividing by the number of job classes. Utility 124 then computes the adjustment factor used to adapt the neural networks, at block 633. The adjustment factor is the difference between the %Error term for each job class and %ErrorAvg. Using this method, the adjustment factors always sum to 0. For example if one job class's %Error is greater than the %ErrorAvg it results in a positive change to its delay cost curve (yielding higher relative priority). At block 634 the utility computes the average dispatch time (tavg) for each job class by summing the time-in-system for each delay cost function invocation and dividing by the number of delay cost function invocations. Utility 124 then calls the neural network delay cost function for each job class, passing the average time-in-system as an input and getting the current delay cost value as the output, at block 635. At block 636 utility 124 computes the delay cost delta for each job class by taking the job class adjustment factor and multiplying by the current delay cost. At block 637 the new target delay cost value is computed by taking the current delay cost value and adding the delay cost delta.

Referring now back to FIG. 6A, at block 604 a single training update is made to each delay cost neural network after each period of operation. The training data pair (tavg, target) is presented to the neural network and the neural network connection weights are adjusted using the learning algorithm. This process repeats a variable number of times by returning to Block 602, normal running of the system.

Since the training steps of FIGS. 6A and 6B may be performed at any arbitrary time, training may be deferred to a time when computer system 100 is not busy. After some number of training iterations, the coefficients of the delay cost function will converge to some optimum value, and thereafter very little change will be observed. At that point, the system operator may wish to discontinue training, or may continue training at less frequent intervals to adjust to subtle changes in system workload and/or configuration occurring over time.

Additional background information concerning the operation of neural network utility 124 can be found in Neural Network Utility/400: User's Guide (IBM Publication No. SC41-8202) and in Neural Network Utility/400: Programmer's Reference (IBM Publication No. SC41-0032), herein incorporated by reference. Additional background information concerning the operation of performance monitor 123 and the interpretation of performance data 126 can be found in Programming: Performance Tools Guide (IBM Publication No. SC21-8084) and Programming: Work Management Guide (IBM Publication No. SC21-8078), herein incorporated by reference. All of these publications are available from IBM Corporation.

Additional background information concerning the present invention can be found in a Ph.D. thesis by Joseph P. Bigus, entitled "Adaptive Operating System Control Using Neural Networks," presented to Lehigh University, a copy of which is appended hereto and incorporated herein by reference.

FIG. 7 through FIG. 10 show examples of the results obtained by adjusting of the delay cost curves using neural networks as described herein.

In these examples, four job classes are defined for the example system. They include terminal and batch closed classes, and transaction and distributed open classes. When jobs arrive at the CPU for service, they are queued based on the length of time in the system. This is calculated as the current time minus the job arrival time. When the CPU becomes free and a job must be selected to run on the CPU, the delay-cost scheduler examines the first job on the queue (longest in the system) for each job class. Each job class has an associated delay-cost curve or function which takes as input a single parameter, the time-in-system, and produces a single output, the delay-cost. The job with the largest delay-cost value is selected to run on the CPU.

In these examples, the delay-cost functions are implemented using feedforward neural networks with a 1-10-1 architecture (1 input, 10 hidden units, and 1 output). A sigmoid activation function was used, resulting in delay-cost values ranging from 0.0 to 1.0. The 4 delay-cost neural networks were initialized with a training set mapping input values ranging from 0 to 8 (in 0.1 increments) to output values of 0.1 to 0.9. This mapping was designed to keep the delay-cost neural networks out of their saturation region.

Target response times were specified for each of the 4 job classes. The goal is to have the neural networks adapt the delay cost curves (and the low-level scheduling of jobs) in order to meet the target response times. Each system was run for 10 days of the standard daily workload, which consists of a 12 hour workday and 24 separate workloads. The neural networks were updated after each 60 second period.

Figure 7:
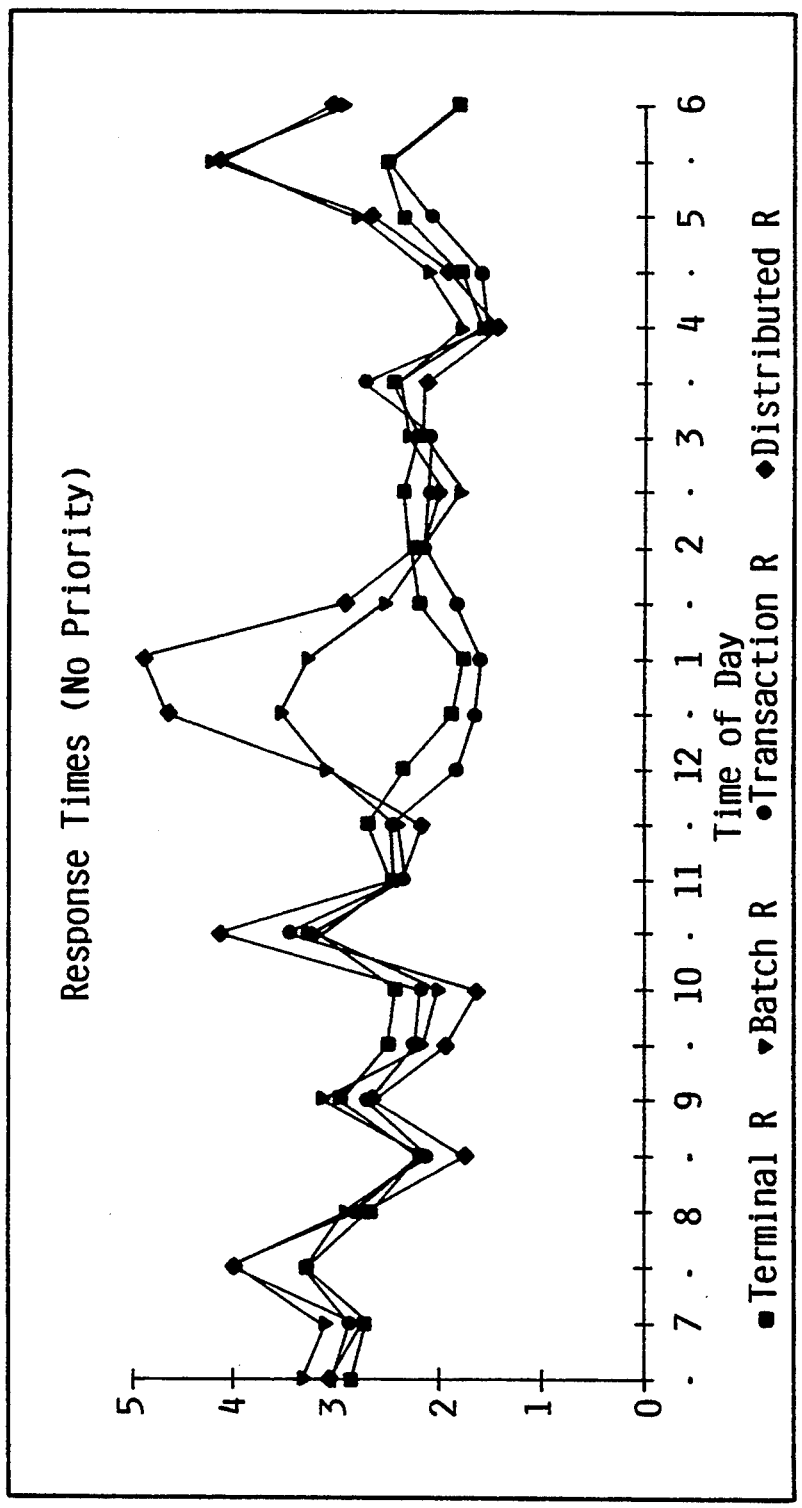
FIG. 7 shows the computer system response time with initial (pre-training) delay cost curves, according to the preferred embodiment.

FIG. 7 shows the response times for the system with the standard workload and a fixed system configuration used. The delay cost curves were in their initialized (linear) states. The average daily response times for the 4 job classes are 2.4, 2.7, 2.3, and 2.7 respectively. These are the response times achieved for a strictly first come first served queueing discipline at the CPU. In the examples, we first set desired response time goals for each job class, and then adapt the neural network delay cost functions in order to affect the delay-cost scheduling decisions and the resulting response times. Each example has different desired response times. The systems were run for 10 days of the standard 12 hour workload. A tolerance of 0.25 seconds was used (if the actual response time was within 0.25 seconds of the target, then the error was set to 0 for that job class).

FIG. 8 is a table showing three examples of desired performance goals specified by the user, and actual performance achieved after training a neural network as described herein. In all three cases, the job class with the lowest desired response time has the lowest actual response time. Also, the actual response times for the Batch jobs were lower than desired (this will be discussed in more detail later). In example 1, the desired response times for the transactions and distributed jobs was set to 1.5, and the actual times were less than 0.02 seconds apart.

Examples 2 and 3 are identical, except that the desired response times for transaction and distributed jobs are inverted. In example 2, the transaction response times are very close to the desired, as are the distributed response times in example 3. In all 3 examples, the neural network delay-cost functions which were learned, produced very good average response times (relative to the desired response times).

Figure 9:
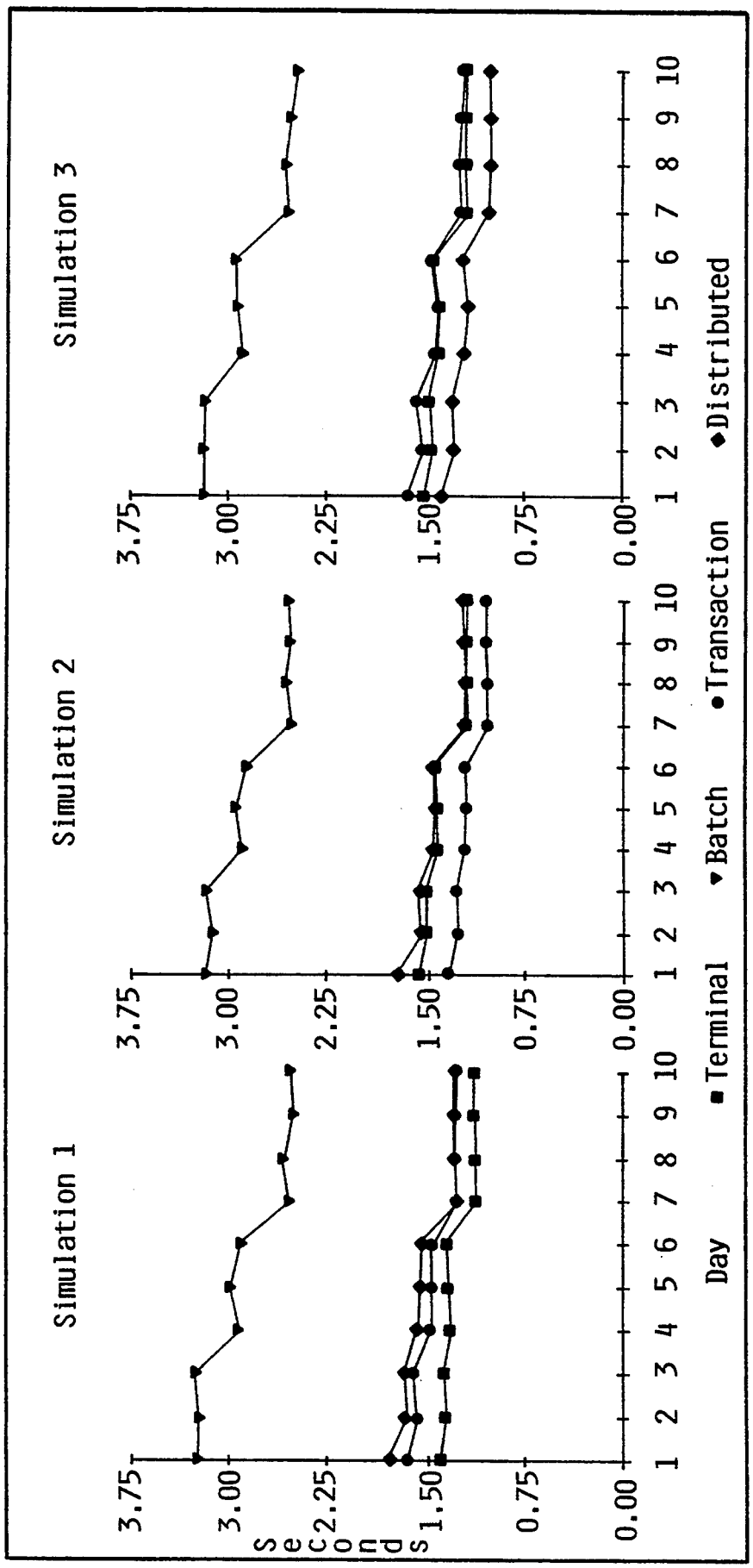
FIG. 9 shows the average response times for the three examples of FIG. 8 over a series of learning iterations.

FIG. 9 shows the average daily response times for the job classes during ten work days used to train the network. Performance data was gathered each day, and the network was retrained with the new performance data at the end of the day. In all three cases, the average response times decrease and then stabilize after approximately seven days. They then remain stable once they are near their desired settings. This make sense, since once the average response times are within 0.25 seconds of the desired times, the errors will go to 0, and no weight changes will be made.

Figure 10:
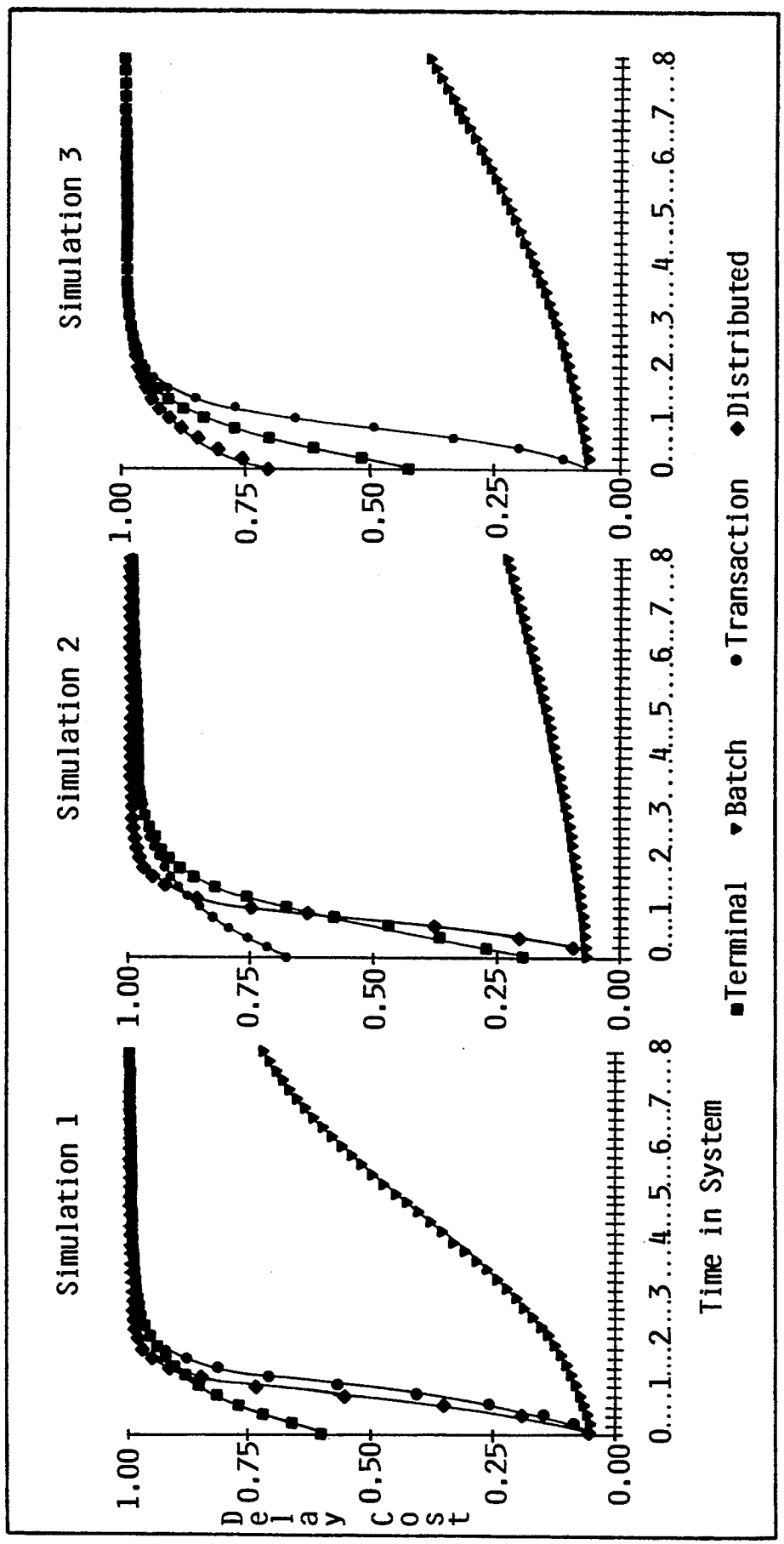
FIG. 10 shows the learned neural network delay cost curves for the three examples.

FIG. 10 shows the resulting delay cost curves for each example. The input values range from 0 to 8 and the resulting response of the delay-cost neural networks are shown. In all cases, the curves are monotonic increasing and nonlinear.

If one thinks of the delay-cost curves as priority functions (which is what they are), then the functions learned by the neural networks match our intuition. For example, in each simulation, the job class with the lowest desired response times has the highest initial delay cost (priority) values (terminals in simulation 1, transactions in 2, and distributed in 3). Also, in all three cases, the batch jobs always have the lowest priority (and the response times were still below the desired). It is also interesting to note that the delay cost functions overlap in several places. This means that depending on the time in the system, the neural networks learned to assign a higher(lower) priority to some job classes. In essence, the neural networks learned to develop a dynamic priority assignment scheme based on the length of time that a job is in the system in order to meet the declared response time goals.

It is difficult to imagine someone working out these delay cost curve shapes based on some performance monitor data, and the desired response times in mind. The neural networks learned to do this based only on the error information between the desired and actual response times taken at specified intervals.

In the preferred embodiment, the job scheduler is used to schedule jobs for service on a CPU of a computer system. However, a job scheduler according to the present invention could be used for many other types of resources in many other environments. For example, the job scheduler could be used to schedule other resources within the computer system, such as access to secondary storage devices, communications links to servers and other computer systems, etc. Additionally, the job scheduler of the present invention could be used to schedule a non-computer resource. For example, it might be used to schedule critical stations of an assembly line within a factory, the "jobs" in this case being work required on assemblies in progress.

As used herein, the term "job" should therefore be understood to broadly encompass any form of work to be performed. The term "job" has been used here because that is the terminology commonly used in the context of computer operating systems. However, in other environments, it may be referred to as a "task", "procedure", "assembly", "work order", etc. The term "job", when used in this specification and claims, encompasses all of these.

In the preferred embodiment, the delay cost function takes a single input parameter (time-in-system). However, it should be understood that the delay cost function could be a function of multiple variables. In particular, the use multiple delay cost functions, one for each job class, is equivalent to a single delay cost function having two parameters, time and job class. These functions could have been constructed using a single neural network having two inputs. Additional parameters might be relevant to a delay cost function. For example, relative job priorities (hence delay cost function value) could vary with time of day or system configuration.

It should be further understood that the input parameter time-in-system may take on different forms. In the general sense, a delay cost function must produce a delay cost as a function of some delay time parameter, where delay time is related to the time a job has been waiting and therefore increases as a job waits in the queue. Typically, a job may require different resources within a system, each of which may have its own queue. A job may therefore move from one queue to another as it receives service from the different resources. Delay time may be measured as the total elapsed time since a user submitted a job, or as the total elapsed time since a job entered the system, or as the total time spent waiting on all queues, or as the time spent waiting on the queue which the job currently occupies. The "time-in-system" of the preferred embodiment, which is the total time elapsed since a job entered the system, is but one possible measure of a delay time parameter.

In the preferred embodiment, an artificial neural network simulated on a single general purpose processor is used to generate the delay cost functions. However, it should be understood that the neural network could alternatively be a real neural network comprising a plurality of hardware nodes, or could be executed on a dedicated special purpose neural network processor. It should further be understood that the network may assume a topology, training strategy, or other characteristics different from those shown in FIG. 4 and described above.

In the preferred embodiment, an optimum or substantially optimum delay cost function is automatically determined by repetitively training a neural network with data obtained from actual performance results. However, in a broader sense the present invention encompasses a job scheduler utilizing a substantially optimum delay cost function which is automatically constructed by a computer system. While a neural network appears to be the most practical method of automatically constructing such a function at the present time, it would not necessarily be the only method of doing so. As computer technology improves, other mechanisms for constructing such a delay cost function may become feasible. For example, it may be possible to construct such a delay cost function using rule-based expert systems or spline functions.

Although a specific embodiment of the invention has been disclosed along with certain alternatives, it will be recognized by those skilled in the art that additional variations in form and detail may be made within the scope of the following claims.

What is claimed is:

1. A method for scheduling jobs from among a plurality of job classes for service by a resource of a work-producing system, comprising the steps of:

defining a set of performance goals for said job classes;

training a neural network for producing a delay cost value function, said delay cost value function implementing said set of performance goals as output from at least one input, wherein at least one input to said neural network represents a delay time with respect to a job waiting for service by said resource;

assigning a respective job delay cost to each of a plurality of jobs waiting for service by said resource using said delay cost value function produced by said neural network: and selecting a next job for service by said resource based on said job delay cost.

2. The method of claim 1, wherein said resource is a computer system resource, and said step of assigning a job delay cost, and said step of selecting a next job for service, are performed by a job scheduler of said computer system's operating system.

3. The method of claim 1, wherein said step of training said neural network comprises the steps of:

gathering data regarding actual performance of said work-producing system; and using said data as training data for said neural network.

4. The method of claim 3, further comprising the steps of:

continuing to gather data regarding actual performance of said work-producing system in response to scheduling jobs in accordance with said delay cost value function of said neural network; and updating said neural network using said data gathered in response to scheduling jobs in accordance with said delay cost value function.

5. An apparatus for scheduling jobs in a computer system, comprising:

means for storing a set of user-defined performance goals for a plurality of job classes;

at least one job queue for jobs awaiting service by a resource in said computer system;

means for automatically constructing a substantially optimum delay cost value function, said delay cost value function implementing said set of performance goals, wherein at least one input to said delay cost value function represents a delay time with respect to a job waiting for service by said resource:

means for applying said delay cost value function to each of a plurality of jobs awaiting service by said resource in said at least one job queue for producing a respective delay cost value for each job;

means for comparing the respective delay cost value of each of said jobs to select a next job for service by said resource, wherein the next job for service selected is a job having highest delay cost value.

6. The apparatus for scheduling jobs of claim 5, wherein said means for automatically constructing a substantially optimum delay cost value function comprises means for training a neural network for producing a delay cost value functions, said delay cost value function implementing said set of performance goals as output from at least one input, wherein at least one input to said neural network represents said delay time with respect to a job waiting for service by said resource.

7. A computer implemented method for scheduling jobs from among a plurality of job classes for service by a resource, comprising the steps of:

inputting a set of performance goals for said job classes to a computer;

automatically constructing, with said computer, a substantially optimum delay cost value functions, said delay cost value function implementing said set of performance goals, wherein at least one input to said delay cost value function represents a delay time with respect to a job waiting for service by said resource;

assigning a respective job delay cost to each of a plurality of jobs waiting for service by said resource using said substantially Optimum delay cost will function automatically constructed by said computer; and selecting a next job for service by said resource based on said job delay cost.

8. The computer implemented method of claim 7, wherein said resource is a resource of said computer system, and said steps of using said substantially optimum delay cost value function to assign a job delay cost, and said step of selecting a next job for service, are performed using a job scheduler of said computer system's operating system.

9. A multi-user computer system for processing a plurality of jobs, comprising:

at least one processing unit;

storage means for storing data and programs in said computer system;

I/O means for communicating with a plurality of users and for receiving requests to perform jobs from said plurality of users;

means for automatically constructing a non-linear delay cost value function in response to a set of performance goals input by a user, wherein at least one input to said delay cost value function represents a delay time with respect to a job waiting for service by a resource of said computer system;

means for computing a respective delay cost value for each of said plurality of jobs in accordance with said delay cost value function;

a job scheduler for scheduling jobs from different users for service, said service being provided by one or more resources of said computer system, wherein said jobs are selected for service 1 in accordance with said delay cost value.

10. The multi-user computer system of claim 9, wherein said means for automatically constructing a non-linear delay cost value function comprises:

a neural network for producing a delay cost value as output from at least one input, wherein at least one input to said neural network represents said delay time with respect to a job waiting for service by said resource; and means for training said neural network to produce a delay cost value function, said delay cost value function implementing said set of performance goals.

11. The multi-user computer system of claim 10, wherein said means for training said neural network comprises:

a performance data gatherer for acquiring data relating to the performance of said system;

means for placing said neural network in a training mode; and means for inputting data gathered using said performance data gatherer as training data to said neural network.

12. A program product apparatus for scheduling jobs from among a plurality of job classes for service by a resource in a work-producing system, said program product being a plurality of computer executable instructions recorded on a computer-readable medium, said program product comprising:

means for receiving as input a set of performance goals for said job classes;

means for training a neural network to produce a delay cost value function, said delay cost value function implementing said set of performance goals as output from at least one input, wherein at least one input to said neural network represents a delay time with respect to a job waiting for service by said resource;

means for using said delay cost value function produced using said neural network for assigning a respective job delay cost to each of a plurality of jobs waiting for service by said resource; and means for selecting a next job for service by said resource based on said job delay cost.

13. The program product of claim 12, wherein said means for training said neural network comprises:

means for gathering data regarding actual performance of said work-producing system; and means for using said data as training data for said neural network.

14. The program product of claim 12, wherein said neural network is an artificial neural network implemented using a plurality of instructions contained in said program product for executing on a computer.

* * * * *